United States Patent
Wildgrube et al.

(10) Patent No.: US 6,169,797 B1
(45) Date of Patent: *Jan. 2, 2001

(54) METHOD FOR SETTING UP TELECOMMUNICATION CONNECTIONS

(75) Inventors: Eberhard Wildgrube, Schwindegg; Eckhard Voelzke, Gruenwald, both of (DE)

(73) Assignee: Siemens Aktiengesellschaft, Munich (DE)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/575,073

(22) Filed: Dec. 19, 1995

(30) Foreign Application Priority Data

Dec. 30, 1994 (DE) .................................. 44 47 258

(51) Int. Cl.⁷ .............................. H04M 3/42; H04M 7/00
(52) U.S. Cl. .......................... 379/233; 379/201; 379/230; 379/901
(58) Field of Search .................................... 379/266, 265, 379/309, 229, 207, 231, 234, 242, 233, 901, 201, 230

(56) References Cited

U.S. PATENT DOCUMENTS

| | | | |
|---|---|---|---|
| 4,955,047 | * | 9/1990 | Morganstein et al. ............ 379/211 X |
| 5,099,511 | * | 3/1992 | Matsumoto ....................... 379/233 X |
| 5,291,551 | * | 3/1994 | Conn et al. .......................... 379/265 |
| 5,459,780 | * | 10/1995 | Sand .................................... 379/265 |
| 5,528,678 | * | 6/1996 | Kaplan ................................. 379/265 |
| 5,530,744 | * | 6/1996 | Charalambous et al. ............ 379/265 |

* cited by examiner

*Primary Examiner*—Harry S. Hong
(74) *Attorney, Agent, or Firm*—Schiff Hardin & Waite

(57) ABSTRACT

For external terminals, telephone number information is provided internally in a private branch exchange. Upon call setup, signalling information is checked to determine if telephone number information is internally present in the private branch exchange to a user of a B-channel in an ISDN system. As warranted, dialing of the telephone number is initiated by a system controller in the private branch exchange.

2 Claims, 3 Drawing Sheets

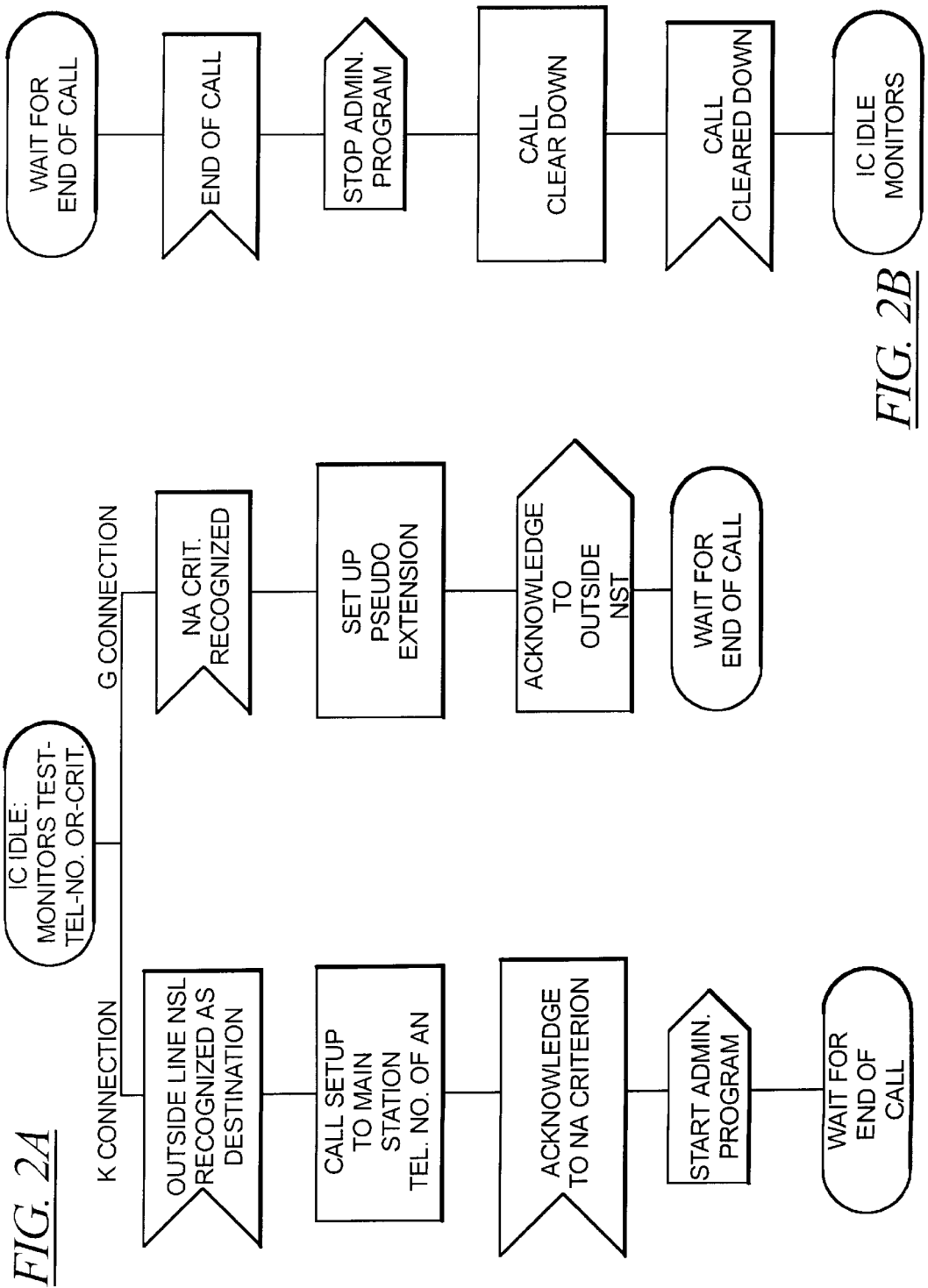

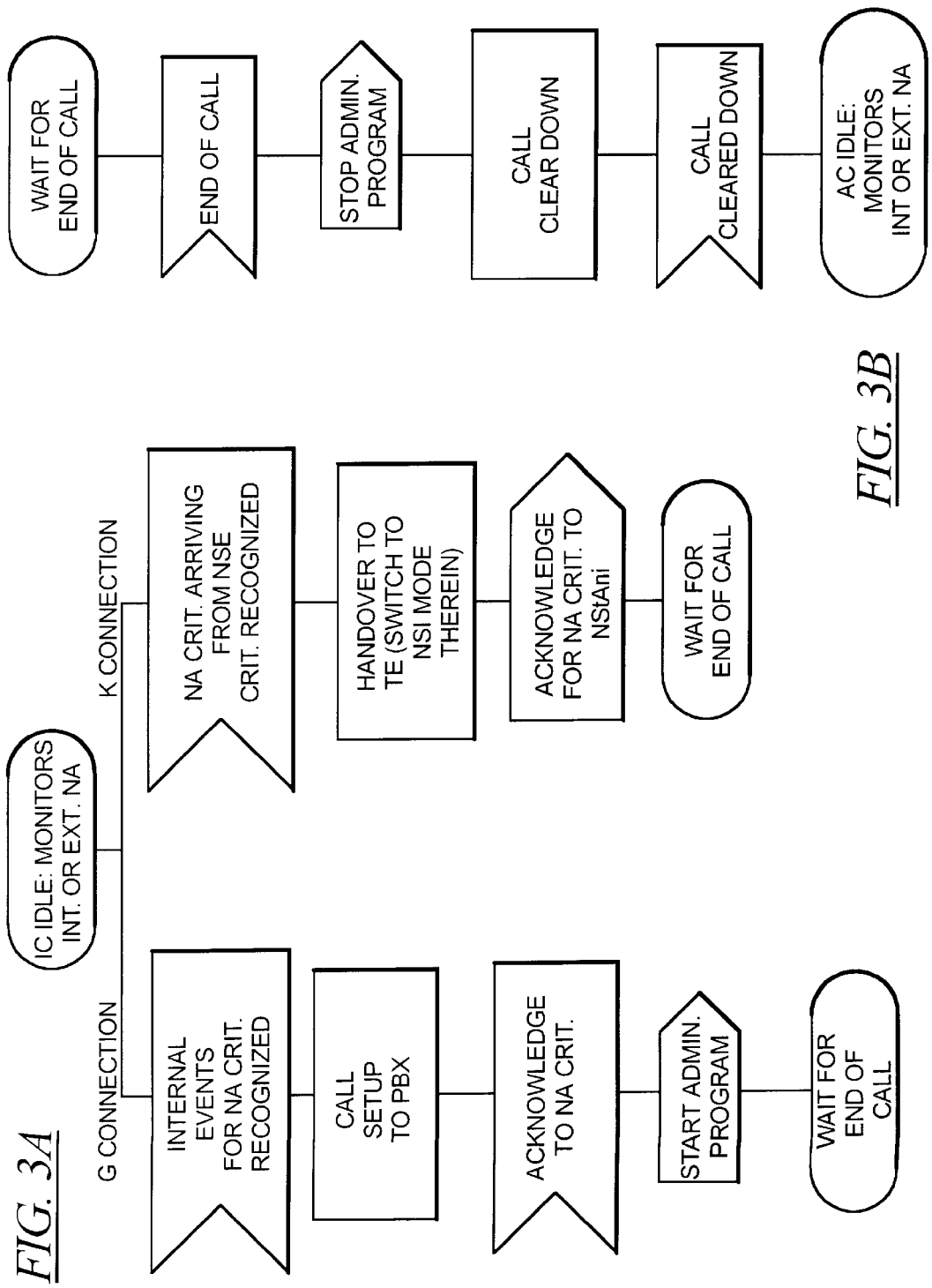

METHOD FOR SETTING UP TELECOMMUNICATION CONNECTIONS

BACKGROUND OF THE INVENTION

The present invention is directed to a method for setting up telecommunication connections in a telecommunication private branch exchange.

Telephone private branch exchanges are known that have remotely located terminals, what are referred to as external extensions. The external extensions are electrically connected to the appertaining private branch exchange via dedicated, physical current paths. Such a structure has the disadvantage, first, that connecting cables must be laid between private branch exchange and external extension or that corresponding trunk lines must be leased from another network operator, for example a public network operator. The connecting cables or lines are to be provided over long distances depending on the local conditions. Transmission-oriented problems such as, for example, attenuation result from transmission of useful information over greater distances. Appropriate measures must be undertaken to eliminate the problems or to keep them within tolerable limits. A further fundamental problem is that the trunk lines cannot be laid over the theoretically shortest path in every case. For example, external extensions cannot be directly connected to the private branch exchange when a street or someone else's property lies between the external extension and the private branch exchange.

SUMMARY OF THE INVENTION

It is an object of the present invention to provide an improved method for setting up telecommunication connections in a telecommunication private branch exchange (PBX).

In general terms the present invention is a method for setting up telecommunication connections in a telecommunication private branch exchange with a controller having a program. Within the framework of a call setup, signalling information, that comprise information indicating the telephone number of the destination user terminal equipment, is checked to determine if respective main station telephone number information is internally present in the system for this telephone number information. The controller initiates the dialing of this main station telephone number insofar as main station telephone number information is internally present in the system for the telephone number of the destination user terminal equipment.

In an advantageous development of the present invention the program allocated to the controller is fashioned such that, within the framework of a call setup, signalling information that comprise information indicating the telephone number of the originating user terminal equipment is checked to determine if respective main station telephone number information is internally present in the system for this telephone number information. The controller, insofar as a main station telephone number information is internally present in the system for the telephone number of the originating user terminal equipment and, insofar as a main station telephone number information is likewise internally present in the system for the telephone number of the destination user terminal equipment or the destination user terminal equipment is an internal user terminal equipment of the telecommunication private branch exchange, activates a system-specific protocol after the set up of the telecommunication connection and enables the transmission of the useful information within the framework of this protocol.

All information required for a switching-oriented linking of external extension to the private branch exchange can thereby be exchanged between extension and private branch exchange in a transparent way via a telecommunication network, particularly the public ISDN. According to the advantageous embodiment of the present invention, the external extensions (terminals) are offered the same scope of performance features as the internal extensions of the private branch exchange.

As a result, the laying of connecting cables is superfluous. Further, the transmission-oriented problems that can particularly occur given trunks of a greater length are avoided.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIGS. 2A and 2B are a simplified flowchart for the control, and since they are internal management tasks, inquiries at its data bank are not separately shown;

FIGS. 3A and 3B are a simplified flowchart for the external controller AC.

DESCRIPTION OF THE PREFERRED EMBODIMENTS

Figure 1:
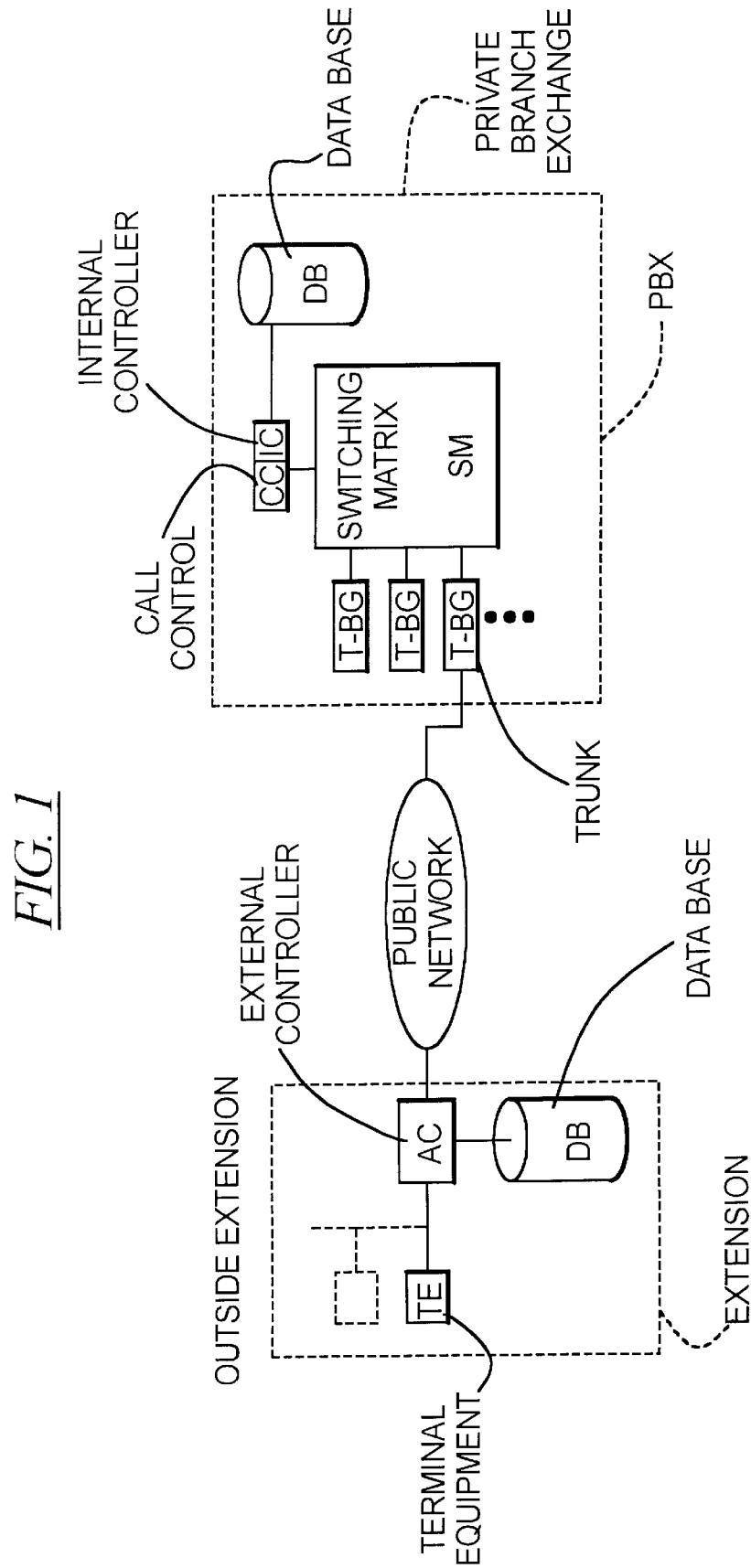
FIG. 1 depicts a domain of the external extension, the private branch exchange and the public network, preferably an ISDN, located between the two.

In a preferred embodiment of the present invention a main station of the public ISDN is established at the location of the external extension. Either one terminal equipment is directly connected or a plurality of terminal equipment in a bus configuration are connected to this main station. Even though the following discussion is directed to only one terminal equipment for the sake of simplicity, the method, of course, also allows ISDN bus operation at the basic access. A special switch means that is referred to below as external controller AC is allocated to the terminal equipment. This external controller AC communicates with a corresponding function means centrally arranged in the private branch exchange, and is referred to below as internal controller IC. A management program sees to it that the two switch means set up a private network signalling connection between the terminal equipment and the private branch exchange. In quiescent condition of the external controller AC, the terminal equipment can communicate directly with the public network. Thus, the external extension also has the function of a main station.

FIG. 1 shows the area of the external extension, the private branch exchange and the public network, preferably an ISDN, located between the two.

One or more terminal equipment TE shown with broken lines are located in the external extension shown in FIG. 1, the external controller AC being allocated to these individually or in common. It is thereby of no consequence to the present invention whether or not the external controller AC and/or the database DB are respectively integrated into the terminal equipment TE or whether they are physically separate devices.

The external controller AC or the database DB can be allocated in common to all terminal equipment TE of the bus, or a separate external controller and/or database can be individually allocated to each terminal equipment TE. FIG. 1 shows the version that is composed of a shared external controller AC with a shared database DB.

The private branch exchange PBX has a plurality of trunk assemblies T-BG, a actual switching matrix SM and a call control function group CC that is required for the control of the switching matrix SM, as well as, for the performance features offered by the private branch exchange PBX. The function groups recited up to now correspond to the standard equipment of the private branch exchange and are only shown here for an understanding of the overall context.

The internal controller IC with the associated database DB are function groups that are additionally inventively required. The function groups as well as the terms used are explained in greater detail below:

The terms "incoming call" and "outgoing call" are used as follows in general and within the framework of this specification: call directions are referred to the terminal equipment TE or, respectively, to the user thereof. An outgoing call is initiated by the user, whereas an incoming call is set up by the respective switching equipment such as, for example, the private branch exchange.

What is meant by the extension line criterion is a criterion that (dependent on the traffic direction) is transmitted between external controller and internal controller or, respectively, vice versa. It serves the purpose of indicating that the call to be set up is a call from or, respectively, to an external extension.

Among others, the following can be used individually or in meaningful combinations as extension line criterion: A special telephone number of the public network which can be a secret call number as warranted. The performance feature "multiple call number" must thereby be potentially established for the terminal equipment TE, so that the normal main line telephone number and the special telephone number can be used in parallel. At the side of the private branch exchange, the individuality of the special telephone number can either be established by the performance feature "multiple telephone number" or by the performance feature "direct inward dialing" in conjunction with a potentially secret extension telephone number. A subaddress insofar as the public network supports the transport thereof. The index of a "closed user group" insofar as the public network supports this performance feature. A special protocol within the useful connection set up between internal and external controller, for example within the auxiliary service of "User-User Signalling No.1" or "User-User Signalling No.3" insofar as the public network supports these performance features.

The selection of the extension line criterion is dependent on the respective conditions in the public network.

In an idle mode, the external controller defines the operation of the external terminal equipment TE as main station. In this mode, it allows incoming and outgoing calls for the terminal equipment TE and the public ISDN. The terminal equipment TE operates in conformity with the protocol as defined in detail for the main station in the interface conditions for the respective public network. Insofar as functionally supported by the terminal equipment, the performance features of the public network allocated to it can be controlled by its user. Alternatively, the terminal equipment can, conversely, participate in the performance features that are called in on the part of the public network or of the other party to a call.

When the external controller AC is activated, the terminal equipment TE behaves like an internal terminal equipment of its private branch exchange PBX. This includes the following. The terminal equipment TE behaves in conformity with protocol as defined in detail for extensions in the interface conditions for the respective private branch exchange. Insofar as functionally supported by the terminal equipment, the performance features of the private branch exchange allocated to it can be controlled by its user. Conversely, the terminal equipment TE can participate in the performance features that are called in on the part of the private branch exchange (or on the part of the other party to a call).

The external controller AC can be activated by the user for outgoing calls, namely either explicitly by inputting a corresponding call such as, for example, by activating a special key or automatically at every outgoing seizure. In the latter instance, the user must explicitly indicate that he does not want to activate the external controller, that is, he would like to use his terminal equipment as main station.

For incoming connections, the external controller AC can be activated by the extension line criterion given to the incoming connection be the internal controller IC.

The internal controller IC is allocated to the system controller (call control function group) CC of the private branch exchange PBX and has a monitor function in the quiescent condition. This checks, first, all inter-exchange, internal and, potentially, interconnections to determine if their destination call numbers correspond to those of an external extension. When this is the case, then according to the present invention it handles this connection as an incoming connection of this external extension.

The internal controller checks all calls arriving from the public network to see whether the extension line criterion is present. When this is the case, then it handles this call as an outgoing connection (in the aforementioned sense) of the external extension.

The two aforementioned conditions are thereby not mutually exclusive. Both the extension line criterion as well as identity of destination call number with an external extension can occur for the traffic from one external extension to another.

When the result of one of these two checks is positive, the internal controller activates further functions dependent on the call direction of the external extension.

The databases at the external extension and in the private branch exchange have fundamentally the same functions, namely to store the type of respectively used extension line criterion, the identity of the respectively other party, the type of transparent path or, respectively, paths for the transmission of the extension line criterion and of the private network signalling extension line criterion, as well as the telephone numbers of the public network with whose assistance the respectively other party can be reached.

The databases, however, would usually have different sizes. Whereas only the parameters for a connection to the associated private branch exchange PBX must be stored at the external extension, the corresponding parameters for all of its external extensions, namely, must be stored in the private branch exchange PBX.

The method of the present invention for call set up shall be described in greater detail below after a brief explanation of the following terms.

In the ideal condition, there is neither a physical nor a logical connection between terminal equipment TE and private branch exchange PBX. No connection or establishing charges are thus incurred that would have to be paid to the operator of the public network apart from the charges to be paid for the terminal equipment TE in its capacity as main station. There are thus only corresponding entries in the two databases as preparatory measure for a use as external extension. When the terminal equipment TE is in fact to be used as such, a connection between it and its appertaining private branch exchange PBX must be set up first.

The event for setting up such a connection is derived by the private branch exchange from the event of the call request given an incoming call or, respectively, is derived by the terminal equipment given an outgoing call. The behavior of the two controllers given the two call set up directions is described below.

Following ISDN principles, both a signalling call as well as a useful channel call, for example in the form of ISDN B-channels, are set up. After the latter has been set up on the line section (external extension, private branch exchange PBX, or vice versa), it is subsequently involved in the continuing call setup between the terminal equipment TE of the external exchange and the remote terminal equipment at the other end of the overall connection (or, respectively, vice versa).

The executive sequence in the private branch exchange PBX for an incoming call is explained below (see FIGS. 2A and 2B).

When the request for set up of an incoming call to the external extension was recognized by the internal controller IC, then this interrogates its database DB for the parameters for reaching the external extension. These can, for example, contain the dialing of main station telephone number. The latter, however, need not necessarily be the case. Instead, abbreviated dialing equipment or a hot-line (instant connection) performance feature of the public network could be indicated for use. Let it be assumed below, however, that the selection of a main station telephone number of the public network is selected. The inquiries at the database are not shown in FIG. 2 since these are a matter of internal management tasks. The same is true of inquiries at the database by the external controller with reference to FIG. 3.

Via the call control function group, the internal controller IC initiates the call setup by the public network by selecting the corresponding main station telephone number and upon employment of the signalling protocol provided for the public network. When it is a telephone number that was established in addition to the telephone number that is used for the main station operation of the external terminal equipment TE, the main station telephone number itself can already form the extension line criterion with which the external controller AC is activated. Otherwise, the extension line criterion is additionally transmitted. The management program is started after the extension line criterion has been acknowledged by the external controller AC.

The executive sequence at the external extension is explained below for an incoming call (see FIG. 3, middle and right branch).

As soon as the external controller AC recognizes the extension line criterion, for example an incoming seizure under the special telephone number or an explicitly indicated criterion, it forwards this criterion, potentially in modified form, to the appertaining terminal equipment or equipments so that such equipment can operate according to the respective interface conditions. This includes that it informs its user of the presence of the extension line criterion in a suitable way.

Further, the external controller answers back to the private branch exchange that it has informed the terminal equipment TE of the presence of an extension line call. The acknowledge is used by the internal controller for starting the management program.

The executive sequence at the external extension is explained below for an outgoing call (see FIGS. 3A and 3B).

In the ideal condition, the external controller AC allows any call requests of the terminal equipment TE in the direction of the public network to pass without influencing them. When, however, it recognizes the extension line criterion explicitly or implicitly input by the user, then it becomes active and inquires of its database DB how the appertaining private branch exchange can be reached. This includes the determination of the form of the extension line criterion to be handed over as well as the indication of the telephone number of the private branch exchange. The statements above about the incoming call set up on the part of the private branch exchange PBX thereby analogously applies for the outgoing call set up. As soon as the external controller has received the acknowledgement about the reception of the extension criterion from the private branch exchange PBX, it starts the management program.

The executive sequence in the private branch exchange PBX is explained below for an outgoing call (see FIGS. 2A and 2B).

Given an outgoing call, the internal controller IC assigns a (real or virtual) "pseudo-extension line" with the identity of the internal telephone number provided for the external extension and the performance features provided therefor to the connection element via which the appertaining inter-exchange connection arrived. The private branch exchange PBX now views the arrived inter-exchange connection as an outgoing call initiated by the pseudo-extension line. The management program sequences between internal and external controller.

The management program is explained in greater detail below.

The function of the management program is to set up a path via the public network, maintain it and in turn clear it down. The private network signalling between private branch exchange PBX and terminal equipment TE in the extension line operating mode are capable of being sequenced transparently via this path.

Particulars about the type of signalling path, preferably about the auxiliary service "User-User Signalling No.3" of the public ISDN or about some other transmission service on a second B-channel, are contained for this purpose in the data banks at the internal controller, as well as, at the external controller.

Let it be assumed below that the auxiliary service "User-User Signalling No.3" of the public network is being used.

As soon as the initiating side (external controller AC given an outgoing or, respectively, internal controller IC given an incoming call) has received the acknowledgement for the extension line criterion, it interprets this as an indication to set up the transparent signalling path.

In the assumed case of "User-User Signalling No.3", this means that this auxiliary service is to be called. To that end, the initiating side makes use of a procedure defined according to the interface conditions of the public network. The private network signalling is subsequently transmitted by the transparent path that has been set up, this leading via the various switching-oriented statuses up to the actual "call" and, subsequently, up to the cleardown thereof.

What are considered as a "call" in this sense are all types of useful data transmission between the users of the connection, regardless of whether this is really a telephone call or, for example, a data transmission or the like. In addition to calling the transparent path for the private network signalling protocol, the management program has the function of making the convergence functions available that are necessary for embedding this signalling protocol into the path in conformity with its transmission properties ("bearer capability"). This includes segmenting and assembling functions, securing functions of an OSI layer 2 and the like. The convergence functions remain active during the entire call duration, that is, they are available at any time for supporting the private network signalling.

When the private signalling is ended (because the call has been ended), then the management program is ended first, that is, the path for the private network signalling is cleared down first, then the B-channel together with the signalling relationship via the public ISDN.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for setting up bidirectional telecommunication connections in a telecommunication private branch exchange having a controller, the method comprising the steps of:

executing a program allocated to a controller at a private branch exchange to establish a signal path, via public network, between said private branch exchange and an external extension, said signal path allowing transmission between said private branch exchange that is transparent to said public network;

in said program allocated to said controller, setting up a call proceeding on said signal path between said private branch exchange and an originating user terminal equipment at said external extension, including transmitting a message indicating said call is to proceed on said signal path, and said program also checking signaling information, having at least destination telephone number information indicating a destination telephone number of destination user terminal equipment, to determine if a main station telephone number information for a main station telephone number is available within said private branch exchange for said destination telephone number information, and via said controller, initiating dialing of said main station telephone number if said main station telephone number information is available, and activating a system-specific protocol wherein user-specific performance features are made available.

2. A method for setting up bidirectional telecommunication connections in a telecommunication private branch exchange having a controller as claimed in claim 1, wherein the method further comprises the steps of:

via said program allocated to said controller, checking within said call setup signaling information that has at least information indicating an originating telephone number of said originating user terminal equipment to determine if said main station telephone number information is available within said private branch exchange for said originating telephone number information;

via said controller, activating said system-specific protocol after set up of a telecommunication connection between said originating user telephone equipment and said destination telephone user equipment, if said main station telephone number information is available for said originating telephone number of said originating user terminal equipment and if said main station telephone number information is also available for said destination telephone number of said destination user terminal equipment, or if said destination user terminal equipment is an internal user terminal equipment of said telecommunication private branch exchange; and enabling transmission of user-information between said originating user telephone equipment and said destination telephone user equipment within said protocol.

* * * * *